United States Patent
Aimandi et al.

(10) Patent No.: US 12,242,382 B2
(45) Date of Patent: Mar. 4, 2025

(54) CACHE INVALIDATION ACROSS DISTRIBUTED MICROSERVICES

(71) Applicant: Oracle International Corporation, Redwood Shores, CA (US)

(72) Inventors: Riaz Ahmad Aimandi, Nashua, NH (US); Vadim Morgunov, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 132 days.

(21) Appl. No.: 17/957,294

(22) Filed: Sep. 30, 2022

(65) Prior Publication Data

US 2024/0111675 A1    Apr. 4, 2024

(51) Int. Cl.
    *G06F 12/00*    (2006.01)
    *G06F 12/0817*    (2016.01)
    *G06F 12/0846*    (2016.01)
    *G06F 12/0891*    (2016.01)

(52) U.S. Cl.
    CPC ...... *G06F 12/0822* (2013.01); *G06F 12/0848* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 11,223,697 B2* | 1/2022 | Carofiglio | H04L 67/568 |
| 2018/0365155 A1* | 12/2018 | Bryc | G06F 12/128 |

OTHER PUBLICATIONS

"Asynchronous message-based communication", Retrieved from https://learn.microsoft.com/en-us/dotnet/architecture/microservices/architect-microservice-container-applications/asynchronous-message-based-communication Sep. 15, 2021, 9 Pages.

"Case Study on Building DataCentric Microservices", DB Technical White Paper May 26, 2020, 41 Pages.

"IBM Automation Event-Driven Reference Architecture—Terms & Definitions", Retrieved from https://jbcodeforce.github.io/refarch-eda/concepts/terms-and-definitions/#microservices, Retrieved on Mar. 23, 2022, 13 Pages.

"Introduction to the IBM Automation Event-Driven Reference Architecture", Retrieved from https://jbcodeforce.github.io/refarch-eda/introduction/overview/, Retrieved on Mar. 23, 2022, 4 Pages.

(Continued)

*Primary Examiner* — Midys Rojas
(74) *Attorney, Agent, or Firm* — Invoke

(57) ABSTRACT

Techniques for cache invalidation across distributed microservices are disclosed, including: monitoring, by a resource manager, a resource that is available for obtaining by a set of one or more resource utilizers, wherein a resource utilizer in the set of one or more resource utilizers obtains a version of the resource; publishing, by the resource manager, a notification stream including notifications associated with the resource, wherein the resource utilizer subscribes to the notification stream including the notifications associated with the resource; detecting, by the resource manager, a modification of the resource; responsive to detecting the modification of the resource: publishing a notification to the notification stream that indicates the modification to the resource.

20 Claims, 5 Drawing Sheets

(56) References Cited

OTHER PUBLICATIONS

"Pub/Sub Messaging", Asynchronous event notifications, Retrieved from https://aws.amazon.com/pub-sub-messaging/, Retrieved on Mar. 23, 2022, 2 Pages.
Evora J., "Microservices in Publish-Subscribe Communication Using Apache Kafka", Retrieved from https://dzone.com/articles/microservices-in-publish-subscribe-communication-u, Nov. 25, 2019, 1 page.
Kanjilal J., "An Introduction to Event Driven Microservices", Retrieved from https://www.developer.com/design/event-driven-microservices/, Nov. 25, 2021, 3 Pages.
Khaku A., "How Netflix microservices tackle dataset pub-sub", Retrieved from https://netflixtechblog.com/how-netflix-microservices-tackle-dataset-pub-sub-4a068adcc9a, Oct. 16, 2019, 5 Pages.
Nowak A., "Understanding Event-Driven Design Patterns for Microservices", Retrieved from https://levelup.gitconnected.com/understanding-event-driven-design-patterns-for-microservices-659b3c9fb51f, Retrieved on Mar. 23, 2022, 4 Pages.
Saleem et al., "Data Caching Across Microservices in a Serverless Architecture", Retrieved from https://aws.amazon.com/blogs/architecture/data-caching-across-microservices-in-a-serverless-architecture/, Jul. 21, 2021, 8 Pages.
Wickramasinghe S., "What is Pub/Sub? Publish/Subscribe Messaging Explained", Retrieved from https://www.bmc.com/blogs/pub-sub-publish-subscribe/, Jul. 26, 2021, 11 Pages.

* cited by examiner

CACHE INVALIDATION ACROSS DISTRIBUTED MICROSERVICES

TECHNICAL FIELD

The present disclosure relates to distributed microservices. In particular, the present disclosure relates to invalidating caches across distributed microservices.

BACKGROUND

In a distributed environment, microservices often need to access data produced by other microservices. These consuming microservices typically cache the data obtained from the other microservices. For example, a consuming microservice may receive data from another microservice and cache the data with a time-to-live (TTL) period. In such cases, a change to the data on the producer side does not immediately propagate to consumers. The consumers' caches may therefore become invalid and may remain invalid, for example, until the TTL period expires. For example, an Internet-of-Things (IoT) device may cache a version of a certificate needed to access a cloud service. The cloud service may detect a condition requiring that version of the certificate to be invalidated and replaced with another version of the certificate. This change renders the IoT device's version of the certificate invalid, even though the TTL period has not expired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. References to "an" or "one" embodiment in this disclosure are not necessarily to the same embodiment and mean at least one. In the drawings.

DETAILED DESCRIPTION

In the following description, for the purposes of explanation and to provide a thorough understanding, numerous specific details are set forth. One or more embodiments may be practiced without these specific details. Features described in one embodiment may be combined with features described in a different embodiment. In some examples, well-known structures and devices are described with reference to a block diagram form, in order to avoid unnecessarily obscuring the present invention.

The following table of contents is provided for reference purposes only and should not be construed as limiting the scope of one or more embodiments.

1. GENERAL OVERVIEW
2. EXAMPLE SYSTEM
    2.1. SYSTEM COMPONENTS
    2.2. DATA STORAGE
    2.3. USER INTERFACE
3. CACHE INVALIDATION ACROSS DISTRIBUTED MICROSERVICES
4. EXAMPLE EMBODIMENT
5. COMPUTER NETWORKS AND CLOUD NETWORKS
6. MICROSERVICE APPLICATIONS
    6.1. TRIGGERS
    6.2. ACTIONS
7. HARDWARE OVERVIEW
8. MISCELLANEOUS; EXTENSIONS

1. General Overview

One or more embodiments publish a notification channel by which consumers can receive notifications when data on the producer side has been modified. Consumers may subscribe to the notification channel, so they are notified in near-real-time of modifications to the data and can respond accordingly.

Notifications published to the notification channel may not include the modified data itself, allowing consumers to make their own determinations of (a) whether or not to obtain the modified data and (b) if so, which schemas and/or protocols to use to request the modified data. The schemas and/or protocols used to request modified data may differ between different consumers. Refraining from including the modified data in the notifications improves system performance by sparing network bandwidth and other computing resources that are not necessary if a consumer does not need the modified data. In addition, refraining from including the modified data in the notifications can improve system security, by allowing consumers to request the modified data over a separate channel that is more secure than the notification channel. One or more embodiments use the same notification channel to publish notifications of changes for multiple data collections, across multiple microservices.

One or more embodiments described in this Specification and/or recited in the claims may not be included in this General Overview section.

2. Example System

2.1. System Components

Figure 1:
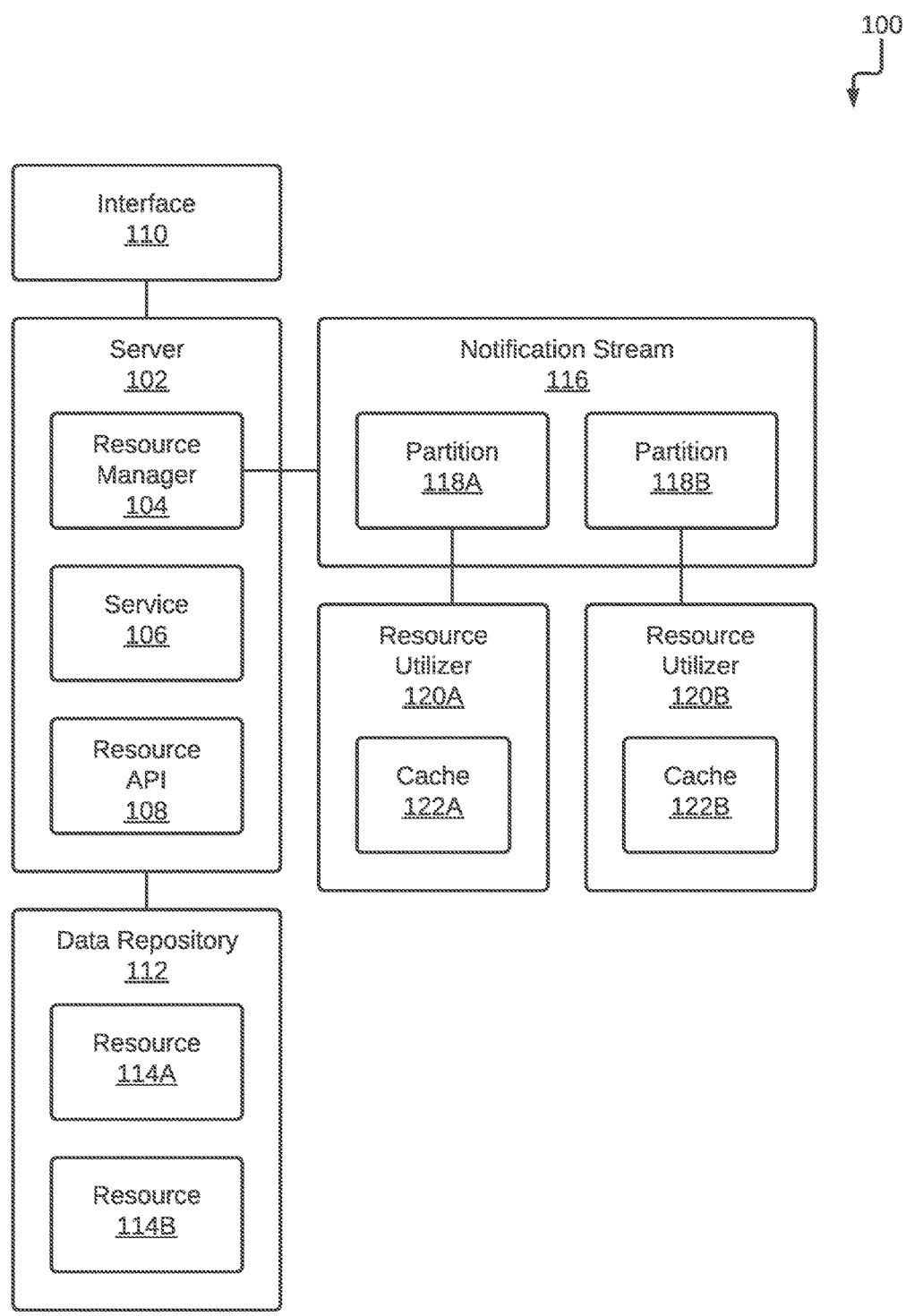
FIG. 1 shows a block diagram that illustrates an example of a system in accordance with one or more embodiments.

FIG. 1 illustrates an example of a system 100 in accordance with one or more embodiments. As illustrated in FIG. 1, the system 100 includes a server 102, a notification stream 116, resource utilizers 120A, 120B, an interface 110, a data repository 112, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below in the section titled "Computer Networks and Cloud Networks."

In one or more embodiments, a server 102 refers to hardware and/or software configured to perform operations for cache invalidation across distributed microservices, examples of which are described below. The server 102 may include a resource manager 104 configured to manage one or more resources 114 (e.g., resources 114A, 114B) stored in a data repository 112. Managing a resource 114 may include monitoring the status of the resource 114, publishing notifications to a notification stream 116 regarding the resource 114, and/or other resource-related operations described herein.

In an embodiment, a resource 114 is associated with a service 106. The service 106 refers to hardware and/or software configured to publish and/or otherwise utilize the resource 114. As one example, the service 106 may be a microservice configured to expose the resource 114 to one or more resource utilizers 120, which may themselves also be microservices. Some examples of microservices are described in further detail below. As another example, the resource utilizers 120 may be Internet-of-Things (IoT) devices and the service 106 may be a cloud service configured to manage and/or otherwise support the IoT devices.

A resource 114 may include any kind of data (e.g., a file, data structure, byte stream, data repository, and/or any other kind of data) used by one or more resource utilizers 120. In this context, the service 106 is a "producer" of the resource 114 and a resource utilizer 120 is a "consumer" of the resource 114. As one example, a resource 114 may include an authorization certificate needed to access one or more features of the service 106. As another example, a resource 114 may include a configuration file, user profile, login credentials (e.g., a public key), and/or another kind of data produced by the service 106 and consumed by one or more resource utilizers 120.

The server 102 may include an application programming interface (API) 108 used by the resource utilizer(s) 120 to obtain the resource(s) 114. For example, the resource API 108 may include a representational state transfer (REST) interface that a duly authorized resource utilizer 120 may query to obtain a copy of a resource 114. The server 102 may include multiple resource APIs 108, and/or a resource API 108 may be configured to receive requests using multiple request schemas and/or security levels. Thus, the notification process can be agnostic to the schema used to transfer resources 114 to resource utilizers 120, providing considerable flexibility in each resource utilizer 120's respective implementation and security features.

A notification stream 116 may also be referred to as a notification feed and/or notification channel. The resource manager 104 may be configured to publish notifications regarding one or more resources 114 via the notification stream 116. A resource utilizer 120 may be configured to subscribe to the notification stream 116, in order to receive the notifications. The resource manager 104 may be configured to publish notifications regarding multiple resources 114 (e.g., resource 114A, 114B) to a single notification stream 116. The notification stream 116 may include multiple partitions 118 corresponding to each resource 114. For example, partition 118A may correspond to resource 114A and partition 118B may correspond to resource 114B. A resource utilizer 120 may be configured to subscribe to notifications via the relevant partition 118A. Continuing the preceding example, resource utilizer 120A may be configured to consume resource 114A and may therefore subscribe to partition 118A; resource utilizer 120B may be configured to consume resource 114B and may therefore subscribe to partition 118B. Alternatively or additionally, the resource manager 104 may be configured to publish notifications to multiple notification streams 116 (not shown).

A notification stream 116 may be implemented in various ways. In an embodiment, notifications use Apache Kafka, and the notification stream 116 corresponds to a Kafka Topic. The partitions 118 may correspond to different Kafka Topic partitions. Alternatively or additionally, modifying a resource 114 and publishing a notification to the notification stream 116 may be an atomic operation, i.e., both the modification and the notification either succeed or fail as a single operation. For example, upon detecting a modification to a resource 114, the resource manager 104 may invoke a blocking "publish" operation (e.g., to publish an event to a Kafka Topic); the response to the publish operation also determines whether the modification is successful or should be rolled back.

Each resource utilizer 120 may be configured to store a local (i.e., local to the resource utilizer 120) copy of a resource 114. Specifically, each resource utilizer 120 may include a cache 122 configured to store the local copy of the resource 114. For example, resource utilizer 120A may store a local copy of resource 114A in cache 122A, and resource utilizer 120B may store a local copy of resource 114B in cache 122B.

In one or more embodiments, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device.

2.2. Data Storage

In one or more embodiments, a data repository 112 is any type of storage unit and/or device (e.g., a file system, database, collection of tables, and/or any other storage mechanism) for storing data. As illustrated in FIG. 1, the data repository 112 may be configured to store one or more resources 114. The data repository 112 may include multiple different storage units and/or devices. The multiple different storage units and/or devices may or may not be of the same type or located at the same physical site. The data repository 112 may be implemented or executed on the same computing system as the server 102 and/or on a computing system separate from the server 102. The data repository 112 may be communicatively coupled to the server 102 via a direct connection or via a network. Information describing one or more resources 114 may be implemented across any of the components of the system 100. However, this information is illustrated within the data repository 112 for purposes of clarity and explanation.

2.3. User Interface

In one or more embodiments, an interface 110 refers to hardware and/or software configured to facilitate communications between a user and the server 102. The interface 110 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms. Different components of the interface 110 may be specified in different languages. For example, the behavior of user interface elements may be specified in a dynamic programming language, such as JavaScript. The content of user interface elements may be specified in a markup language, such as hypertext markup language (HTML) or XML User Interface Language (XUL). The layout of user interface elements may be specified in a style sheet language, such as Cascading Style Sheets (CSS). Alternatively, the interface 110 may be specified in one or more other languages, such as Java, Python, C, or C++.

3. Cache Invalidation Across Distributed Microservices

Figure 2A:
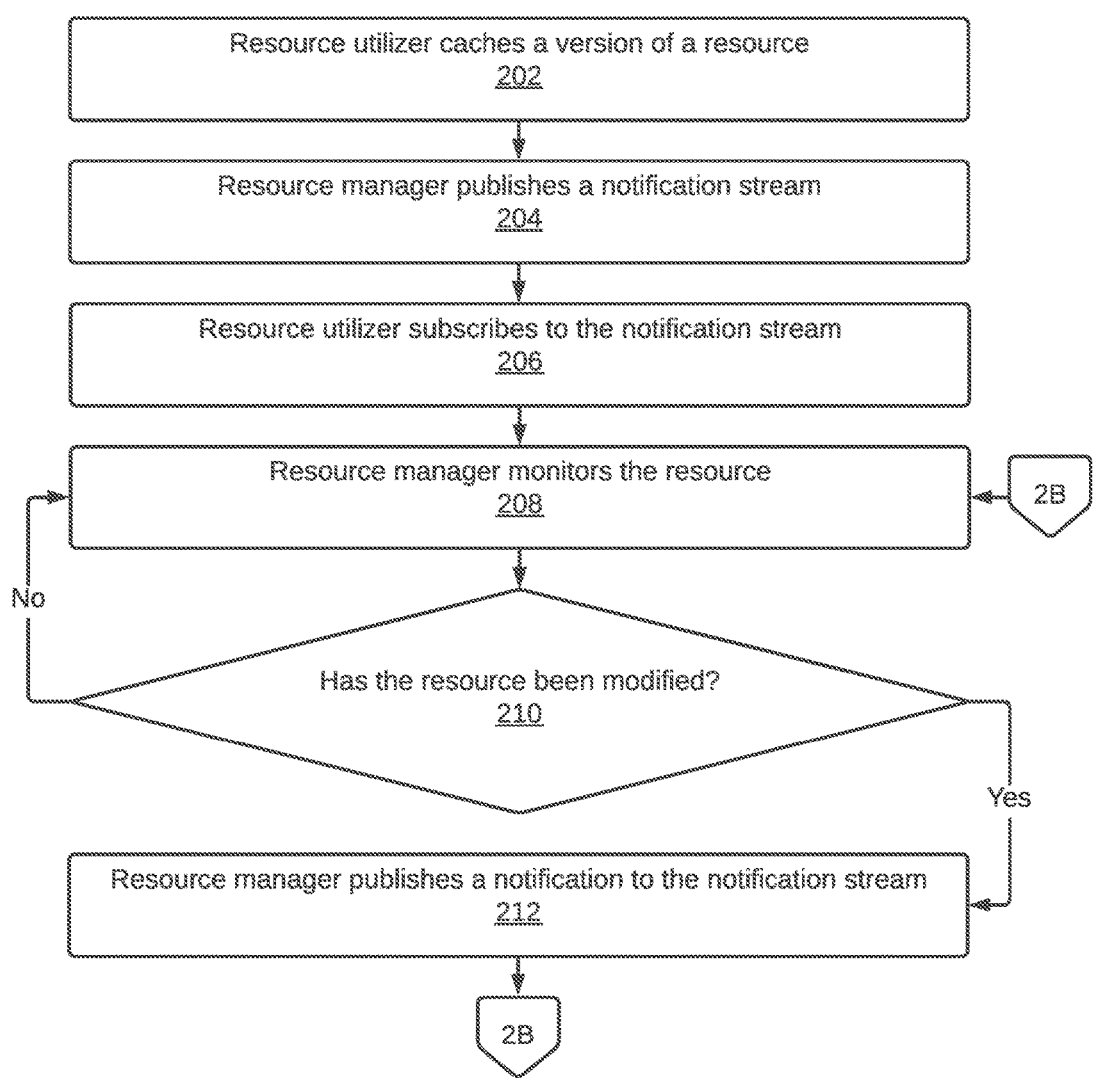
FIGS. 2A-2B illustrate an example set of operations for cache invalidation across distributed microservices in accordance with one or more embodiments.
Figure 2B:
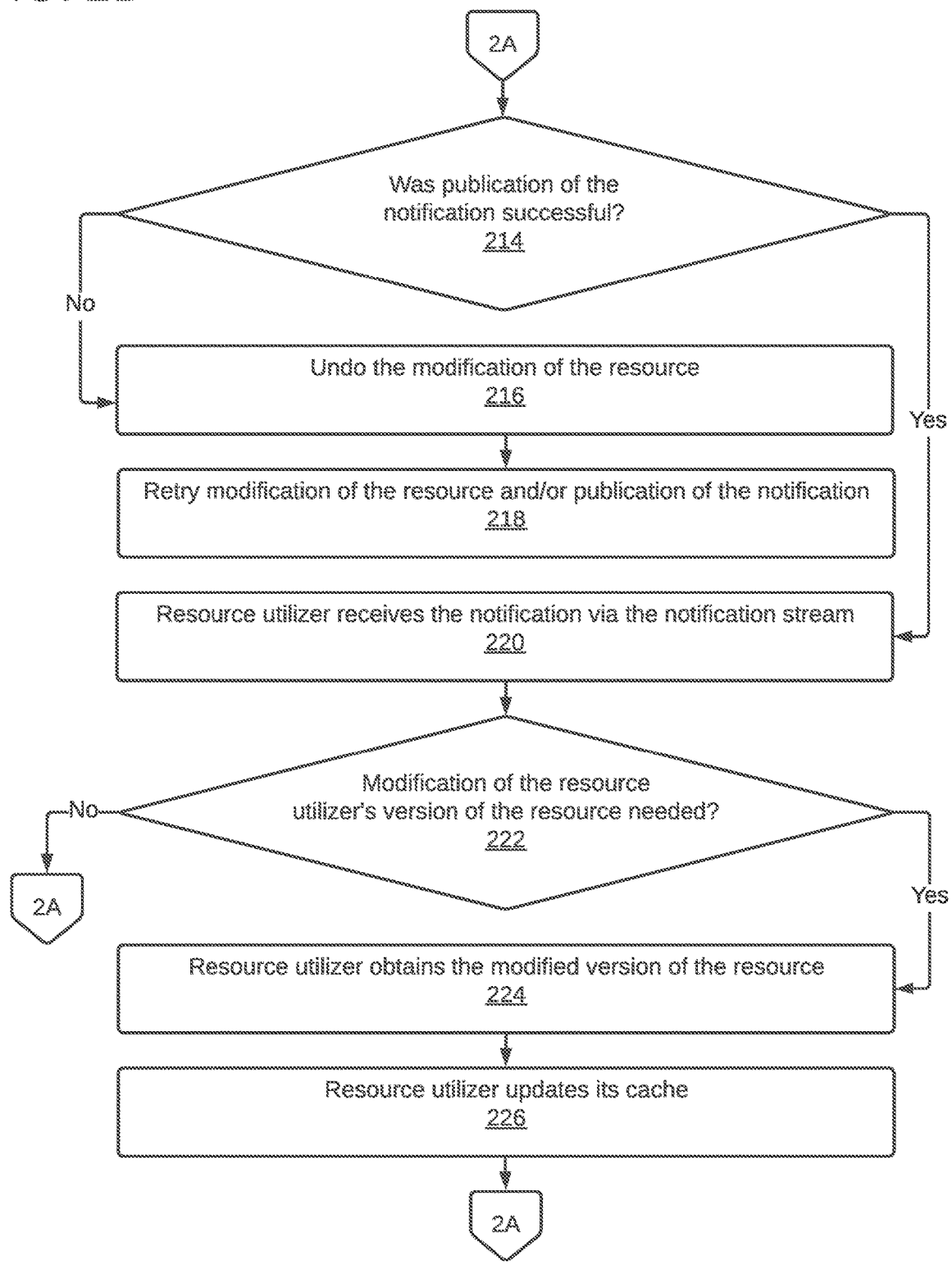

FIGS. 2A-2B illustrate an example set of operations for cache invalidation across distributed microservices in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments.

In an embodiment, a resource utilizer caches a version of a resource (Operation 202). For example, an IoT device may cache a version of a certificate needed to access a cloud service. The resource utilizer may need to obtain the version of the resource from a producer; for example, the resource utilizer may query a resource API to obtain the version of the resource. Alternatively or additionally, the resource utilizer may be initially provided with the version of the resource already cached. For example, an IoT device may be provided with a version of a certificate already stored in its cache.

A resource manager may publish a notification stream associated with the resource (Operation 204). As described above, the resource manager may publish multiple notification streams and/or multiple stream partitions corresponding to different resources. The resource utilizer subscribes to the notification stream (Operation 206), in order to receive notifications regarding the resource. If the notification stream includes multiple partitions, the resource utilizer may subscribe to the corresponding partition.

The resource manager may monitor the resource (Operation 208) to determine if resource has been modified from its prior state, e.g., deleted or modified to a different version. For example, if the resource is a certificate, the resource manager may monitor the certificate to determine if it has changed to a different version. The resource manager may monitor the resource by periodically querying a data repository, subscribing to notifications from a data repository, and/or in some other way.

If the resource manager determines that the resource has been modified (Operation 210), then the resource manager publishes a notification to the notification stream (Operation 212). The notification indicates that the resource has been modified. The notification may not include any version of the resource itself.

In some cases, publication of the notification may not be successful. For example, a network failure or other hardware and/or software issue may prevent the notification from successfully publishing to the notification stream. The resource manager may determine if publication of the notification was successful (Operation 214). If the publication was not successful, then the resource manager may undo the modification of the resource (Operation 216). If the modification was already committed to data storage, then undoing the modification of the resource may rollback the commit. For example, a newer version of the resource (e.g., a certificate) may be replaced with the prior version of that resource. If the modification was not already committed to data storage, then undoing the modification may refrain from committing the modification. For example, the resource manager may refrain from committing a newer version of the resource, leaving the prior version in place. If the resource is a certificate, the older version of the certificate may remain valid until both the modification and publication are successful.

If the modification and notification are an atomic operation, as discussed herein, the resource manager may retry the modification and notification (Operation 218). If the modification and notification are separate operations and the modification was not undone (e.g., Operation 216 was not performed), the resource manager may retry publishing the notification. If the modification and notification are separate operations and the modification was undone (e.g., Operation 216 was performed), the resource manager may first retry modifying the resource and then retry publishing the notification. The resource manager may retry the modification and/or notification up to a predetermined number of times, after which the resource manager may generate an error (not shown).

If the resource manager determines that publication of the notification was successful (Operation 214), the notification is available to subscribers of the notification stream. The resource utilizer may receive the notification via the notification stream (Operation 220). In some cases, the resource utilizer is not required to modify its local copy of the resource in response to the notification. A particular modification may not be relevant to a particular subscriber. For example, multiple kinds and/or versions of IoT devices may subscribe to the same notification stream, and an update to a particular certificate may not be relevant to a particular device. Alternatively or additionally, the resource may include a collection of properties, and the resource utilizer may only be interested in changes to a particular subset of the properties. The resource utilizer may determine if modifying its local version of the resource is needed (Operation 222). If modifying the resource utilizer's version of the resource is not needed, then the resource utilizer may take no action to modify its version of the resource. The resource manager continues to monitor the resource and the resource utilizer continues to monitor the notification stream for relevant notifications.

If modification of the resource utilizer's version of the resource is needed, the resource utilizer obtains the modified version of the resource (Operation 224). If the notification includes the modified version of the resource, then the resource utilizer obtains the modified version from the notification stream itself. If the notification does not include the modified version of the resource, the resource utilizer may query the resource API to obtain the modified version of the resource. For example, the resource utilizer may query the resource API to obtain the subset of modified properties that is/are relevant to that particular resource utilizer. Alternatively, the notification may indicate that the resource has been deleted, in which case it is not necessary to obtain a modified version of the resource. The resource utilizer updates its cache (Operation 226), either by storing the modified version of the resource or deleting the resource from its cache, as indicated by the notification.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims. Specifically, FIGS. 3A-3D illustrate an example of cache invalidation across distributed microservices in accordance with one or more embodiments.

Figure 3A:
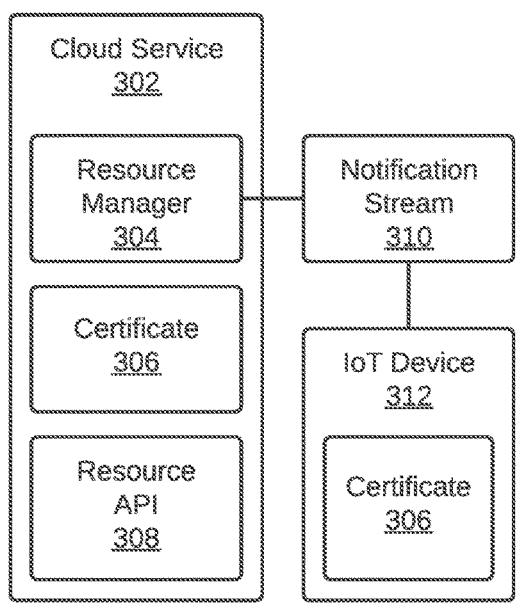
FIGS. 3A-3D illustrate an example of cache invalidation across distributed microservices in accordance with one or more embodiments.
Figure 3B:
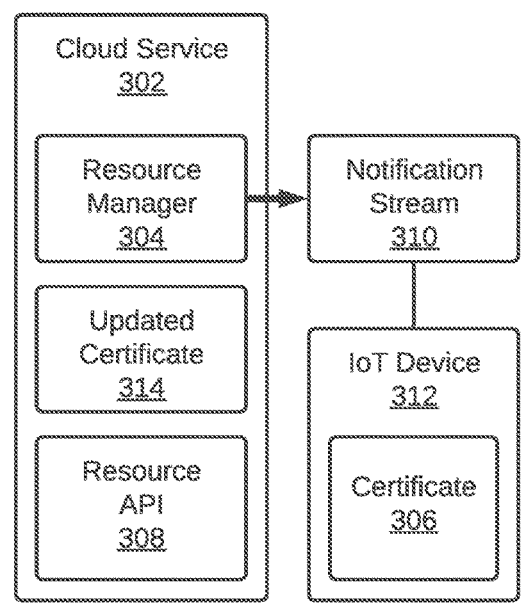
Figure 3C:
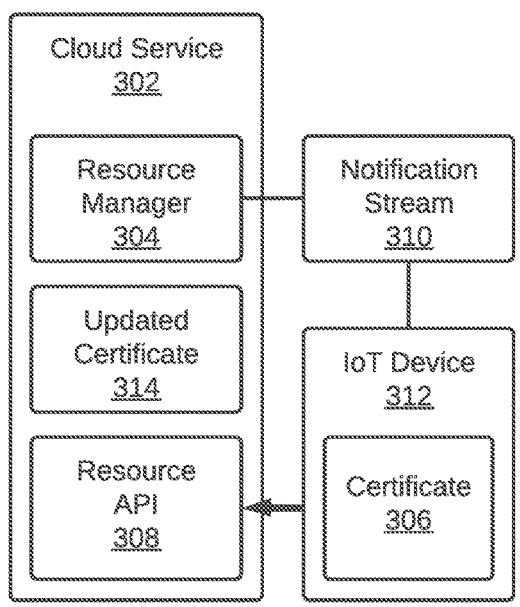
Figure 3D:
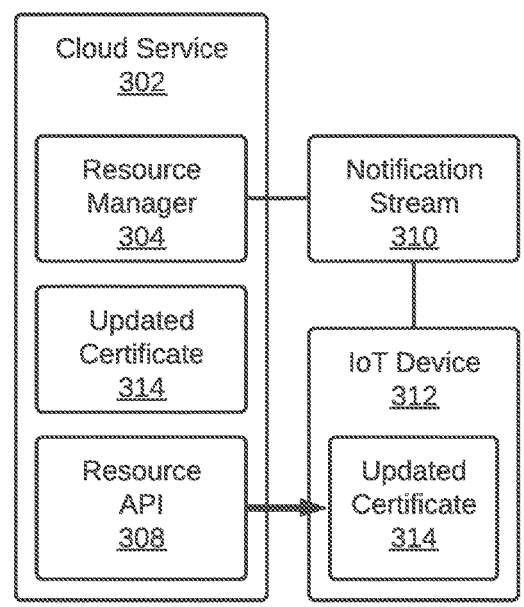

As shown in FIG. 3A, a cloud service 302 is configured to provide services to an IoT device 312. Initially, the cloud service 302 and IoT device 312 each store a particular version of an access certificate 306 needed by the IoT device 312 to access the cloud service 302. The cloud service 302 includes a resource manager 304 configured to monitor the cloud service 302's version of the certificate 306 and publish notifications to a notification stream 310. The IoT device 312 subscribes to the notifications via the notification stream 310. The cloud service 302 also includes a resource API 308 that the IoT device 312 can query to obtain a copy of the certificate 306. As shown in FIG. 3B, the cloud service 302's version of the certificate has been modified to an updated certificate 314. The resource manager 304 detects the modification and publishes a notification to the notification stream 310. The notification does not include the updated certificate 314; it only notifies subscribers that the updated certificate 314 is available. As shown in FIG. 3C, responsive to receiving the notification via the notification stream 310, the IoT device 312 queries the resource API 308 to request the updated certificate 314. As shown in FIG. 3D, the resource API 308 returns the updated certificate 314 and the IoT device 312 updates its cache with the updated certificate 314.

It should be appreciated that a notification stream may serve many different purposes. For example:

- A notification stream may inform subscribers that a new certificate will be available at some time in the future; a subsequent notification may indicate when the new certificate is live.
- A notification stream may inform subscribing IoT devices, which may be behind a firewall, of one or more configuration changes. The notification stream may use an asynchronous channel, and an IoT device may then access a synchronous API to retrieve the actual configuration change(s), if and when appropriate.
- A notification stream may inform subscribing microservices about system events. For example, if one or more microservices have exceeded an allotted storage capacity, the notification stream may inform the microservice(s) of a system event; the notification may not include details of the event. A microservice may then, at its own discretion, access a separate API to retrieve details of the event. The microservice may then analyze the event details to determine an appropriate remedial action, if any.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service, such as execution of a particular application and/or storage of a particular amount of data). A server process responds by, for example, executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, or a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network, such as a physical network. Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

A client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (for example, a web browser), a program interface, or an application programming interface (API).

In one or more embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In one or more embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

A computer network may implement various deployment, including but not limited to a private cloud, a public cloud, and/or a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof may be accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In one or more embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In a multi-tenant computer network, tenant isolation may be implemented to ensure that the applications and/or data of different tenants are not shared with each other. Various tenant isolation approaches may be used. Each tenant may be associated with a tenant identifier (ID). Each network resource of the multi-tenant computer network may be tagged with a tenant ID. A tenant may be permitted access to a particular network resource only if the tenant and the particular network resources are associated with the same tenant ID.

For example, each application implemented by the computer network may be tagged with a tenant ID, and tenant may be permitted access to a particular application only if the tenant and the particular application are associated with a same tenant ID. Each data structure and/or dataset stored by the computer network may be tagged with a tenant ID, and tenant may be permitted access to a particular data structure and/or dataset only if the tenant and the particular data structure and/or dataset are associated with a same tenant ID. Each database implemented by the computer network may be tagged with a tenant ID, and tenant may be permitted access to data of a particular database only if the tenant and the particular database are associated with the same tenant ID. Each entry in a database implemented by a multi-tenant computer network may be tagged with a tenant ID, and a tenant may be permitted access to a particular entry only if the tenant and the particular entry are associated with the same tenant ID. However, the database may be shared by multiple tenants.

In one or more embodiments, a subscription list indicates which tenants have authorization to access which network resources. For each network resource, a list of tenant IDs of tenants authorized to access the network resource may be stored. A tenant may be permitted access to a particular network resource only if the tenant ID of the tenant is included in the subscription list corresponding to the particular network resource.

In one or more embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may be transmitted only to other devices within the same tenant overlay network. Encapsulation tunnels may be used to prohibit any transmissions from a source device on a tenant overlay network to devices in other tenant overlay networks. Specifically, packets received from the source device may be encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Microservice Applications

In one or more embodiments, techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally include a single logical executable. With microservice applications, different microservices are independently deployable as separate executables. Microservices may communicate using Hypertext Transfer Protocol (HTTP) messages and/or according to other communication protocols via Application Programming Interface (API) endpoints. Microservices may be managed and updated separately, written in different languages, and executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

Microservices may be connected via a GUI. For example, microservices may be displayed as logical blocks within a window, frame, or other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

6.1. Triggers

The techniques described above may be encapsulated into a microservice, according to one or more embodiments. In other words, a microservice may trigger a notification (into the microservices manager for optional use by other plugged-in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects that a value has crossed a triggering threshold.

A trigger, when satisfied, may output data for consumption by the target microservice. Alternatively or additionally, when satisfied, a trigger may output a binary value indicating that the trigger has been satisfied, and/or may output the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

6.2. Actions

A plugged-in microservice application may expose actions to the microservices manager. The exposed actions may receive, as input, data or an identification of a data object or location of data that causes data to be moved into a data cloud.

The exposed actions may receive, as input, a request to increase or decrease existing alert thresholds. The input may identify existing in-application alert thresholds and whether to increase, decrease, or delete the threshold. The input may request the microservice application to create new in-application alert thresholds. The in-application alerts may trigger alerts to the user while logged into the application or may trigger alerts to the user, using default or user-selected alert mechanisms available within the microservice application itself, rather than through other applications plugged into the microservices manager.

The microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7. Hardware Overview

In one or more embodiments, techniques described herein are implemented by one or more special-purpose computing devices. The special-purpose computing device(s) may be hard-wired to perform the techniques, and/or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, FPGAs, or NPUs with custom programming to accomplish the techniques. A special-purpose computing device may be desktop computer systems, portable computer systems, handheld devices, networking devices, or any other device that incorporates hard-wired and/or program logic to implement the techniques.

Figure 4:
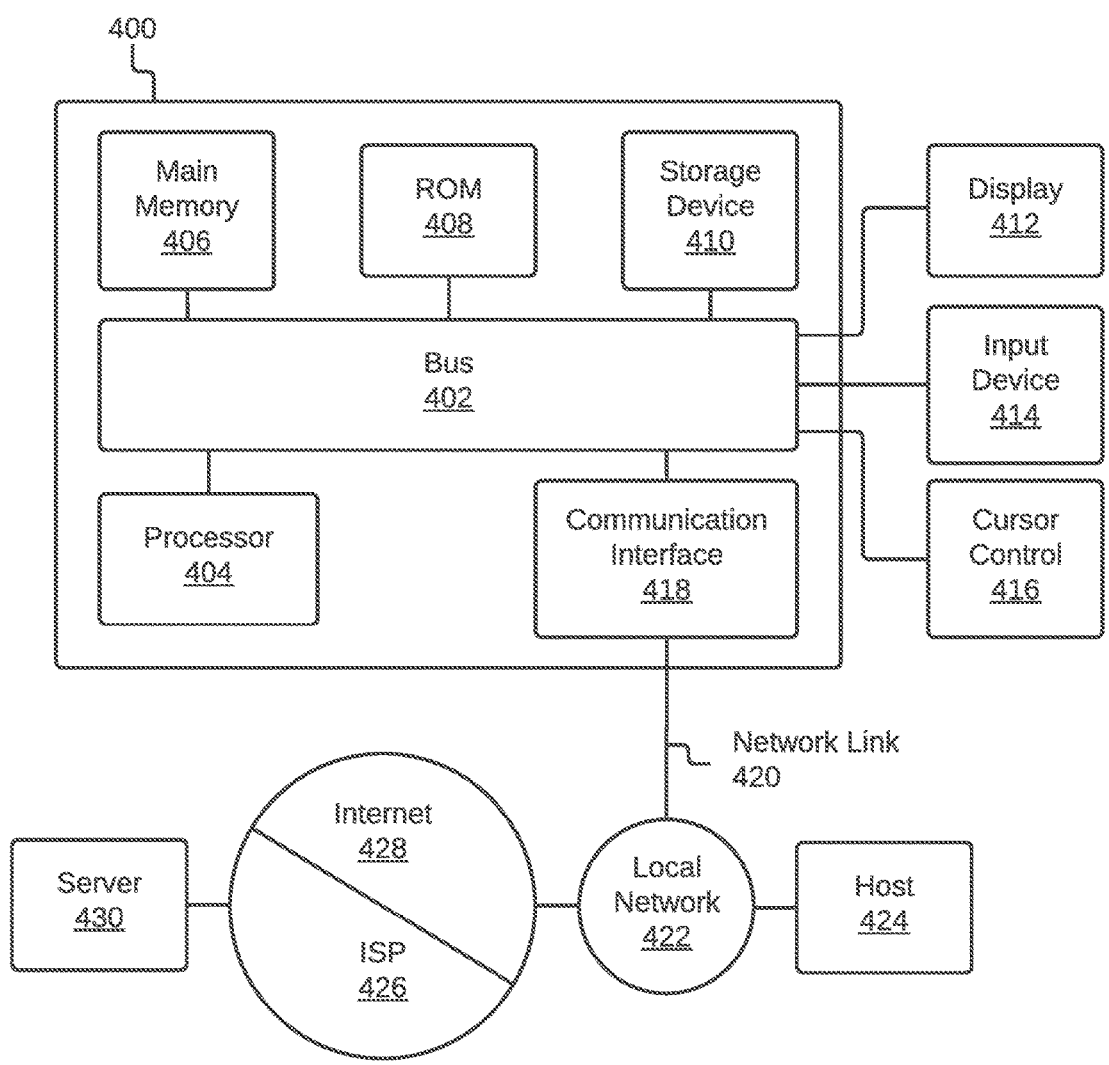
FIG. 4 shows a block diagram that illustrates a computer system in accordance with one or more embodiments.

For example, FIG. 4 is a block diagram that illustrates a computer system 400 upon which one or more embodiments of the invention may be implemented. The computer system 400 includes a bus 402 or other communication mechanism for communicating information, and a hardware processor 404 coupled with bus 402 for processing information. The hardware processor 404 may be, for example, a general-purpose microprocessor.

The computer system 400 also includes a main memory 406, such as a random access memory (RAM) or other dynamic storage device, coupled to bus 402 for storing information and instructions to be executed by processor 404. The main memory 406 also may be used for storing temporary variables or other intermediate information during execution of instructions to be executed by processor 404. Such instructions, when stored in non-transitory storage media accessible to the processor 404, render the computer system 400 into a special-purpose machine that is customized to perform the operations specified in the instructions.

The computer system 400 further includes a read only memory (ROM) 408 or other static storage device coupled to the bus 402 for storing static information and instructions for the processor 404. A storage device 410, such as a magnetic disk or optical disk, is provided and coupled to the bus 402 for storing information and instructions.

The computer system 400 may be coupled via the bus 402 to a display 412, such as a cathode ray tube (CRT), for displaying information to a computer user. An input device 414, including alphanumeric and other keys, is coupled to the bus 402 for communicating information and command selections to the processor 404. Another type of user input device is cursor control 416, such as a mouse, a trackball, or cursor direction keys for communicating direction information and command selections to the processor 404 and for controlling cursor movement on the display 412. This input device typically has two degrees of freedom in two axes, a first axis (e.g., x) and a second axis (e.g., y), that allows the device to specify positions in a plane.

The computer system 400 may implement techniques described herein using customized hard-wired logic, one or more ASICs or FPGAs, firmware, and/or program logic which in combination with the computer system 400 causes or programs the computer system 400 to be a special-purpose machine. In one or more embodiments, the techniques herein are performed by the computer system 400 in response to the processor 404 executing one or more sequences of one or more instructions contained in the main memory 406. Such instructions may be read into the main memory 406 from another storage medium, such as the storage device 410. Execution of the sequences of instructions contained in the main memory 406 causes the processor 404 to perform the process steps described herein. Alternatively, hard-wired circuitry may be used in place of or in combination with software instructions.

The term "storage media" as used herein refers to any non-transitory media that store data and/or instructions that cause a machine to operate in a specific fashion. Such storage media may include non-volatile media and/or volatile media. Non-volatile media includes, for example, optical or magnetic disks, such as storage device 410. Volatile media includes dynamic memory, such as the main memory 406. Common forms of storage media include, for example, a floppy disk, a flexible disk, hard disk, solid state drive, magnetic tape, or any other magnetic data storage medium, a read-only compact disc (CD-ROM), any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires of the bus 402. Transmission media can also take the form of acoustic or light waves, such as those generated during radio frequency (RF) and infrared data communications.

Various forms of media may be involved in carrying one or more sequences of one or more instructions to the processor 404 for execution. For example, the instructions may initially be carried on a magnetic disk or solid-state drive of a remote computer. The remote computer can load the instructions into its dynamic memory and send the instructions over a telephone line or other communications medium, using a modem. A modem local to the computer system 400 can receive the data on the telephone line or other communications medium and use an infrared transmitter to convert the data to an infrared signal. An infrared detector can receive the data carried in the infrared signal and appropriate circuitry can place the data on the bus 402. The bus 402 carries the data to the main memory 406, from which the processor 404 retrieves and executes the instructions. The instructions received by the main memory 406 may optionally be stored on the storage device 410, either before or after execution by processor 404.

The computer system 400 also includes a communication interface 418 coupled to the bus 402. The communication interface 418 provides a two-way data communication coupling to a network link 420 that is connected to a local network 422. For example, the communication interface 418 may be an integrated services digital network (ISDN) card, cable modem, satellite modem, or a modem to provide a data communication connection to a corresponding type of telephone line. As another example, the communication interface 418 may be a local area network (LAN) card configured to provide a data communication connection to a compatible LAN. Wireless links may also be implemented. In any such implementation, the communication interface 418 sends and receives electrical, electromagnetic, or optical signals that carry digital data streams representing various types of information.

The network link 420 typically provides data communication through one or more networks to other data devices. For example, the network link 420 may provide a connection through a local network 422 to a host computer 424 or to data equipment operated by an Internet Service Provider (ISP) 426. The ISP 426 in turn provides data communication services through the world wide packet data communication network now commonly referred to as the "Internet" 428. The local network 422 and Internet 428 both use electrical, electromagnetic, or optical signals that carry digital data streams. The signals through the various networks and the signals on the network link 420 and through the communication interface 418, which carry the digital data to and from the computer system 400, are example forms of transmission media.

The computer system 400 can send messages and receive data, including program code, through the network(s), network link 420, and communication interface 418. In the Internet example, a server 430 might transmit a requested code for an application program through the Internet 428, ISP 426, local network 422, and communication interface 418.

The received code may be executed by processor 404 as it is received, and/or may be stored in the storage device 410 or other non-volatile storage for later execution.

8. Miscellaneous; Extensions

Embodiments are directed to a system with one or more devices that include a hardware processor and that are configured to perform any of the operations described herein and/or recited in any of the claims below.

In one or more embodiments, a non-transitory computer-readable storage medium stores instructions which, when executed by one or more hardware processors, cause performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions that, when executed by one or more processors, cause performance of operations comprising:
    monitoring, by a resource manager, a resource that is available for obtaining by a set of one or more resource utilizers, wherein a first resource utilizer in the set of one or more resource utilizers obtains a first version of the resource;
    publishing, by the resource manager, a notification stream comprising notifications associated with the resource, wherein the first resource utilizer subscribes to the notification stream comprising the notifications associated with the resource;
    detecting, by the resource manager, a modification of the resource;
    responsive to detecting the modification of the resource:
        publishing a first notification to the notification stream that indicates the modification to the resource;
    determining, by the resource manager, that publishing the first notification to the notification stream failed;
    responsive to determining that publishing the first notification to the notification stream failed:
        undoing the modification of the resource.

2. The one or more non-transitory machine-readable media of claim 1, the operations further comprising:
    obtaining, by the first resource utilizer from the resource manager, the first version of the resource;
    storing, by the first resource utilizer, a cached copy of the first version of the resource;
    subscribing, by the first resource utilizer, to the notification stream;
    receiving, by the first resource utilizer via the notification stream, a second notification that indicates the modification to the resource;
    responsive to receiving the second notification via the notification stream: discarding, by the first resource utilizer, the cached copy of the first version of the resource.

3. The one or more non-transitory machine-readable media of claim 1, the operations further comprising:
    committing the modification;
    wherein undoing the modification of the resource comprises reversing the modification after committing the modification.

4. The one or more non-transitory machine-readable media of claim 1, wherein undoing the modification of the resource comprises refraining from committing the modification.

5. The one or more non-transitory machine-readable media of claim 1, wherein publishing the first notification to the notification stream is part of an atomic operation that also comprises modifying the resource.

6. The one or more non-transitory machine-readable media of claim 1, wherein the first notification does not include any version of the resource.

7. The one or more non-transitory machine-readable media of claim 1, wherein:
    the set of one or more resource utilizers comprises one or more Internet-of-Things (IoT) devices;
    the first version of the resource comprises a first version of a certificate for the one or more IoT devices to access a cloud service;
    the modification comprises (a) modifying the resource to a second version comprising a second version of the certificate and (b) invalidating the first version of the certificate.

8. The one or more non-transitory machine-readable media of claim 1, wherein:
    the resource manager comprises a first microservice;
    the set of one or more resource utilizers comprises a plurality of resource utilizers corresponding, respectively, to a plurality of microservices configured to consume data from the first microservice.

9. The one or more non-transitory machine-readable media of claim 1, wherein the resource is one of a plurality of resources for which the resource manager publishes notifications to the notification stream.

10. The one or more non-transitory machine-readable media of claim 9, wherein the notification stream comprises a plurality of partitions corresponding, respectively, to the plurality of resources.

11. The one or more non-transitory machine-readable media of claim 9, wherein the notification stream is one of a plurality of notification streams published by the resource manager and corresponding, respectively, to the plurality of resources.

12. The one or more non-transitory machine-readable media of claim 1, wherein the modification to the resource comprises deleting the resource from a data store.

13. The one or more non-transitory machine-readable media of claim 1, wherein the modification to the resource comprises altering the resource from the first version of the resource to a second version of the resource.

14. The one or more non-transitory machine-readable media of claim 1:
    wherein the first resource utilizer is one of a plurality of resource utilizers subscribed to the notification stream;
    wherein the resource manager publishes the first notification to the notification stream once for all of the plurality of resource utilizers subscribed to the notification stream.

15. The one or more non-transitory machine-readable media of claim 1:
    wherein the resource is a certificate;
    wherein the first resource utilizer is a device that is provided with a first version of the certificate;
    wherein detecting the modification of the resource comprises detecting a new version of the certificate.

16. The one or more non-transitory machine-readable media of claim 1, the operations further comprising:
    responsive to determining that publishing the first notification to the notification stream failed:
        retrying the modification to the resource;
        publishing a second notification to the notification stream that indicates the modification to the resource.

17. The one or more non-transitory machine-readable media of claim 1:
    wherein responsive to notifications published by the resource manager to the notification stream, the first resource utilizer is configured to request modified versions of the resource using a first schema or protocol;
    wherein responsive to notifications published by the resource manager to the notification stream, a second resource utilizer is configured to request modified versions of the resource using a second schema or protocol that is different from the first schema or protocol.

18. The one or more non-transitory machine-readable media of claim 1, the operations further comprising:
receiving, by the first resource utilizer via the notification stream, a second notification that indicates the modification to the resource;
responsive to receiving the second notification via the notification stream:
determining, by the first resource utilizer, that the first resource utilizer does not require the modification to the resource;
responsive to determining that the first resource utilizer does not require the modification to the resource:
refraining, by the first resource utilizer, from obtaining the modification to the resource.

19. A method comprising:
monitoring, by a resource manager, a resource that is available for obtaining by a set of one or more resource utilizers, wherein a first resource utilizer in the set of one or more resource utilizers obtains a first version of the resource;
publishing, by the resource manager, a notification stream comprising notifications associated with the resource, wherein the first resource utilizer subscribes to the notification stream comprising the notifications associated with the resource;
detecting, by the resource manager, a modification of the resource;
responsive to detecting the modification of the resource:
publishing a first notification to the notification stream that indicates the modification to the resource;
determining, by the resource manager, that publishing the first notification to the notification stream failed;
responsive to determining that publishing the first notification to the notification stream failed:
undoing the modification of the resource;
wherein the method is performed by at least one device including a hardware processor.

20. A system comprising:
one or more hardware processors;
one or more non-transitory computer-readable media; and
program instructions stored on the one or more non-transitory computer readable media which, when executed by the one or more hardware processors, cause the system to perform operations comprising:
monitoring, by a resource manager, a resource that is available for obtaining by a set of one or more resource utilizers, wherein a first resource utilizer in the set of one or more resource utilizers obtains a first version of the resource;
publishing, by the resource manager, a notification stream comprising notifications associated with the resource, wherein the first resource utilizer subscribes to the notification stream comprising the notifications associated with the resource;
detecting, by the resource manager, a modification of the resource;
responsive to detecting the modification of the resource:
publishing a first notification to the notification stream that indicates the modification to the resource;
determining, by the resource manager, that publishing the first notification to the notification stream failed;
responsive to determining that publishing the first notification to the notification stream failed:
undoing the modification of the resource.

* * * * *